TELEGRAPH RECEIVER

Filed March 14, 1952

INVENTOR
V.J.TERRY-J.D.HOLLAND
I.R.J.JAMES
BY Philip M. Bolton
ATTORNEY

Patented Feb. 24, 1953 2,629,776

UNITED STATES PATENT OFFICE 2,629,776

TELEGRAPH RECEIVER

Victor John Terry, John Douglas Holland, and Ivor Reginald John James, London, England, assignors to International Standard Electric Corporation, New York, N. Y.

Application March 14, 1952, Serial No. 276,624
In Great Britain March 2, 1951

2 Claims. (Cl. 178—69)

Figure 1:
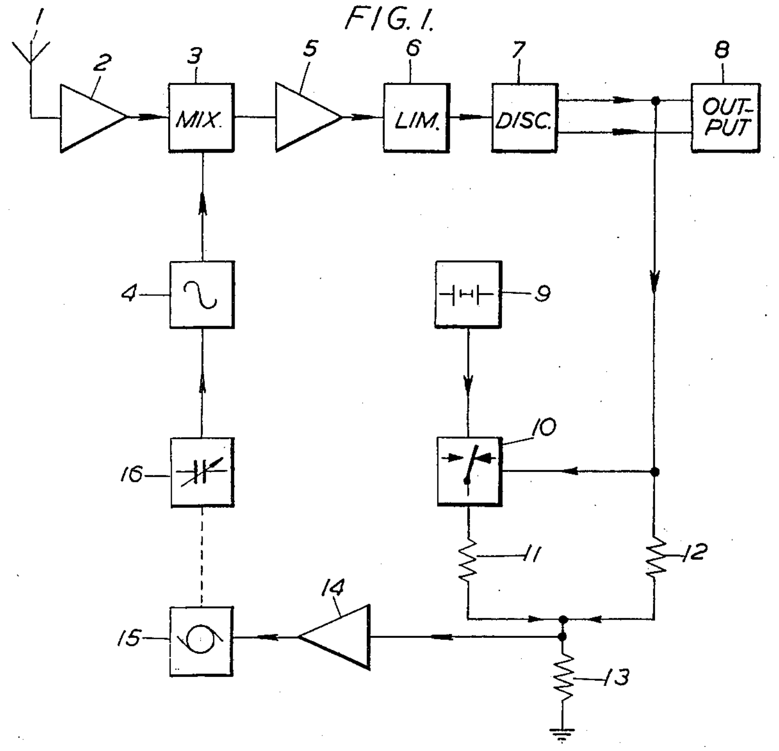

This invention relates to receivers for frequency-shift telegraph signals and has for its object to provide arrangements at the receiver for automatically compensating for the effect of variations in the transmitted frequency.

Frequency shift signalling consists of radiating a signal that is slightly higher than the nominal carrier frequency, corresponding to a mark; and a signal slightly lower in frequency than the nominal carrier, corresponding to a space.

At the receiving terminal the shifting signal should be symmetrically located about the centre frequency of a discriminator. The output from the discriminator will consist of positive and negative voltages of rectangular form, and of duration times corresponding to the particular code used. The amplitude of the positive pulses (mark) should be exactly equal to the negative pulses (space).

It is usual to select the half amplitude points of this keying wave as a triggering or threshold level, such that as soon as the voltages on mark or space have built up to this half-amplitude point a polarised relay is operated. (In practice a D. C. amplifier would be used in order to raise the level of these voltages to a value that would satisfactorily operate a relay.)

Now if the signal changes slowly in frequency due to the various oscillators in the system moving away from their nominal frequency, the amplitudes of the D. C. outputs from the discriminator will no longer be identical and a D. C. displacement occurs, until in the ultimate condition the marking and spacing frequencies both lie to one side or the other of the centre frequency or cross-over point of the discriminator, in which case the system will break down since either the marking or the spacing output will be lost.

It is clearly necessary therefore that the shifting signal be always symmetrically located about the centre frequency of the discriminator.

When the telegraph receiver is used with a teleprinter operating on the start-stop system it must supply to the teleprinter relay a holding current (mark) during non-traffic conditions in order that the mechanism will appreciate a start (space) signal when traffic recommences. This means that during non-signalling periods a continuous signal of slightly higher frequency than the nominal (average) carrier is transmitted. It has been found difficult in the past to apply automatically the correct compensation for frequency drift during this long mark period.

According to the present invention there is provided a receiver for frequency shift telegraph signals subject to random frequency variations, comprising means for deriving from the received signals a first voltage wave alternating in polarity between marking and spacing signals, means for producing a second voltage wave of opposite polarity to said first voltage wave and of amplitude equal to that of said first voltage wave in the absence of said variations, means for adding said first and second waves to produce a control voltage wave, and means for applying said control wave to adjust the tuning of the receiver to compensate for said variations.

Figure 2:
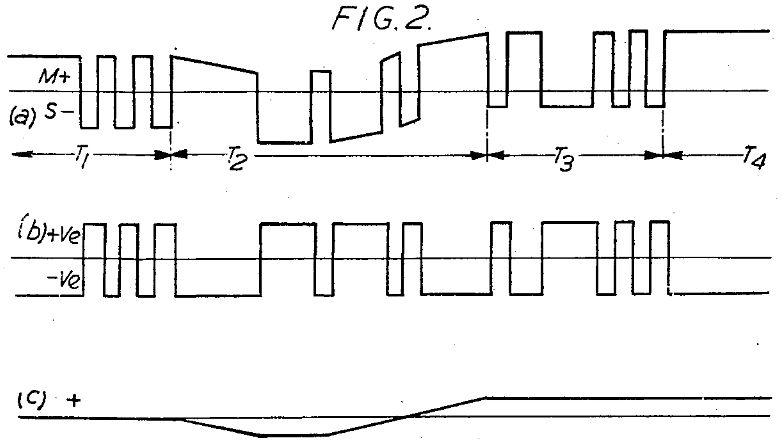

An embodiment of the invention will now be described with reference to the accompanying drawing in which:

Fig. 1 is a block schematic diagram of a telegraph receiver according to the invention, and Fig. 2 consists of three curves to illustrate the working of the invention.

Referring to Fig. 1, incoming signals are received by the antenna 1 and amplified in the R. F. amplifier 2. The output of amplifier 2 is mixed in a mixer stage 3 with the output of a local oscillator 4. The output from mixer 3 is amplified in an I. F. amplifier 5 and after limiting by a limiter stage 6 passes to a discriminator 7. This discriminator provides a D. C. output of a form such as that shown in Fig. 2 (*a*). This waveform represents typical D. C. voltages obtained from the output terminals of a discriminator in which the amplitudes above and below the datum line (zero volts) correspond to the degree of frequency excursion of the mark and space modulations respectively. It will be seen that for the first few elements, during period T1, the mark and space voltages are equal in magnitude. During the period T2 the mark voltage undergoes a gradual D. C. displacement firstly in a negative direction and then in a positive direction. These variations are caused by unwanted variations (as distinct from wanted modulations) in the transmitted carrier frequency or in the tuning of the local heterodyning oscillator 4 at the receiver. During the period T3 the D. C. output is mostly in a positive direction and the period T4 represents the condition when signalling has stopped and a holding (mark) potential is applied to the line. It will be noticed that owing to unwanted frequency drift the mark potential at this stage is greater in amplitude than during the time T1. Part of the output from discriminator 7 is taken to a utilisation device 8 which may be for example a telegraph relay forming part of a teleprinter.

The remaining output of discriminator 7 is used to control the frequency of the oscillator 4 in the manner now to be described.

A source of D. C. potential 9 feeds a reversing switch 10 controlled by the output of discriminator 7. Thus one polarity is applied to the upper end (in the figure) of decoupling resistor 11 during marks and the opposite polarity during spaces. Fig. 2 (*b*) shows the variations in the potential applied to resistor 11. It will be seen that the magnitude of this voltage wave is at all times equal and opposite to the correct voltage output obtained from the discriminator 7 during the time T1.

The two voltage waves *a* and *b* are added across a common resistor 13 and the resulting voltage wave is shown at *c* in Fig. 2. Referring to the latter figure it will be seen that during the time T1 the two voltages cancel out to produce a control voltage of zero. For the remainder of the time a voltage wave is produced whose polarity and magnitude depend on the frequency excursion. Furthermore it will be seen that during the long marking condition (T4) a steady control voltage is present.

The control voltage thus produced is amplified in a D. C. amplifier 14 and applied to a tuning motor 15. This motor controls a tuning circuit 16 associated with the local oscillator 4. By this means the frequency of the oscillator 4 is adjusted in sympathy with the random variations in the received signal frequency so that the output beat frequency from mixer 3 remains centred about the nominal carrier frequency. This in turn means that the D. C. output from discriminator 7 is equally spaced about a zero voltage datum.

In considering the working of this embodiment it will be assumed that when the incoming signal is exactly on tune, the output from discriminator 7 is, say, +2 volts on mark and −2 volts on space. The working of the embodiment may then be more clearly understood from the following table.

| Condition | Output volts from Discriminator | | D. C. voltages to be added to output volts from Discriminator | | Resultant voltage available for control purposes | |
|---|---|---|---|---|---|---|
| | On Mark | On Space | On Mark | On Space | On Mark | On Space |
| On Tune | +2 | −2 | −2 | +2 | 0 | 0 |
| Mark High | +3 | −1 | −2 | +2 | +1 | +1 |
| Mark Low | +1 | −3 | −2 | +2 | −1 | −1 |

As already explained the D. C. voltages from the constant potential source 9 are adjusted to have exactly the amplitude of the mark or space voltages originating from the discriminator 7. The resultant voltages available for control do not add since the mark and space signals are not on together. Hence we would get +1 volt or −1 volt for mark high or low respectively.

While the principles of the invention have been described above in connection with specific embodiments and particular modifications thereof it is to be clearly understood that this description is made only by way of example and not as a limitation on the scope of the invention.

What we claim is:

1. A receiver for frequency shift telegraph signals subject to random frequency variation, comprising means for receiving incoming signals, a tunable local oscillator, means for mixing said incoming signals with the output of said local oscillator to produce a given intermediate-frequency, a discriminator means, means for applying said intermediate-frequency to said discriminator means, means for deriving from said discriminator a first voltage waveform alternating in polarity between marking and spacing signals, and means for using said voltage waveform to control the frequency output of said local oscillator, said last mentioned means comprising a source of direct-current potential, means for varying said direct-current potential to produce a second alternating waveform having a magnitude equal and opposite to the correct voltage output from said discriminator, means for adding said two voltage waveforms, the resultant waveform having a polarity and magnitude dependent on said frequency variation, and means for applying said resultant waveform to means for tuning said local oscillator to compensate for said variation.

2. The receiver according to claim 1, wherein said means for tuning said local oscillator comprises a tuning motor coupled to said tunable oscillator.

VICTOR JOHN TERRY.
JOHN DOUGLAS HOLLAND.
IVOR REGINALD JOHN JAMES.

REFERENCES CITED

The following references are of record in the file of this patent:

UNITED STATES PATENTS

| Number | Name | Date |
|---|---|---|
| 1,921,022 | Burton | Aug. 8, 1933 |
| 2,457,268 | Teterson | Dec. 28, 1948 |